United States Patent [19]

Henseler et al.

[11] Patent Number: 5,280,954
[45] Date of Patent: Jan. 25, 1994

[54] INFLATABLE IMPACT PROTECTION CUSHION

[75] Inventors: Wolfgang Henseler, Tübingen; Ulrich Tschäschke, Ehningen; Manfred Müller, Deizisau; Luigi Brambilla, Böblingen, all of Fed. Rep. of Germany

[73] Assignee: Mercedes-Benz AG, Fed. Rep. of Germany

[21] Appl. No.: 907,528

[22] Filed: Jul. 2, 1992

[30] Foreign Application Priority Data

Jul. 24, 1991 [DE] Fed. Rep. of Germany ....... 4124506

[51] Int. Cl.$^5$ .............................................. B60R 21/16
[52] U.S. Cl. ................................... 280/743 R; 188/376
[58] Field of Search ........... 280/743, 728, 730, 743 R, 280/728 R; 188/376

[56] References Cited

U.S. PATENT DOCUMENTS

| Re. 33,398 | 10/1990 | Grunewald | 280/801 X |
|---|---|---|---|
| 4,186,941 | 2/1980 | Scholz et al. | 280/743 |
| 4,458,921 | 7/1984 | Chiba et al. | 280/806 |
| 4,541,504 | 9/1985 | Lassche | 280/806 |
| 4,645,232 | 2/1987 | Hamada et al. | 280/801 |
| 4,917,210 | 4/1990 | Danicek et al. | 280/806 X |
| 4,982,981 | 1/1991 | Fourrey et al. | 280/801 |
| 4,999,004 | 3/1991 | Skanberg et al. | 280/806 X |
| 5,094,477 | 3/1992 | Togawa | 280/743 |
| 5,104,193 | 4/1992 | Fohl | 280/806 X |
| 5,114,090 | 5/1992 | Lindblad | 280/806 X |
| 5,118,135 | 6/1992 | Yano | 280/806 |
| 5,143,403 | 9/1992 | Fohl | 280/806 |

FOREIGN PATENT DOCUMENTS

| 0420664 | 3/1991 | European Pat. Off. | 280/806 |
|---|---|---|---|
| 2030863 | 12/1971 | Fed. Rep. of Germany . | |
| 2552815 | 5/1977 | Fed. Rep. of Germany . | |
| 2944319 | 5/1981 | Fed. Rep. of Germany | 280/743 |
| 3818185 | 8/1989 | Fed. Rep. of Germany . | |
| 1-36943 | 6/1991 | Japan | 280/728 |
| 3-136945 | 6/1991 | Japan . | |
| 4-056652 | 2/1992 | Japan . | |

OTHER PUBLICATIONS

Beifahrer-Airbag'System ATZ 91 (1989) p. 207.

*Primary Examiner*—Karin L. Tyson
*Attorney, Agent, or Firm*—Evenson, McKeown, Edwards & Lenahan

[57] ABSTRACT

In an impact protection cushion which can be accommodated in the steering wheel region for protection of the vehicle driver, a tearing seam is provided which joins the cushion upper part, which moves forward upon inflation, to the cushion lower part fastened to a fixed vehicle part. This arrangement prevents any radiating forward movement of parts of the cushion upper part, in particular, of a central region laying opposite the gas inflow opening in the cushion lower part without restraining straps.

3 Claims, 2 Drawing Sheets

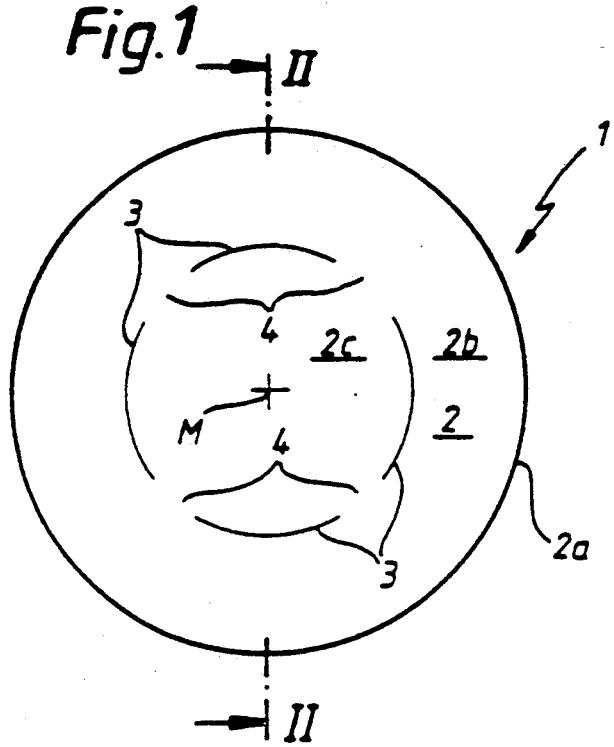
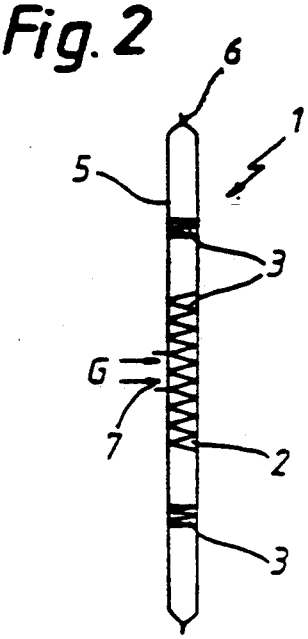
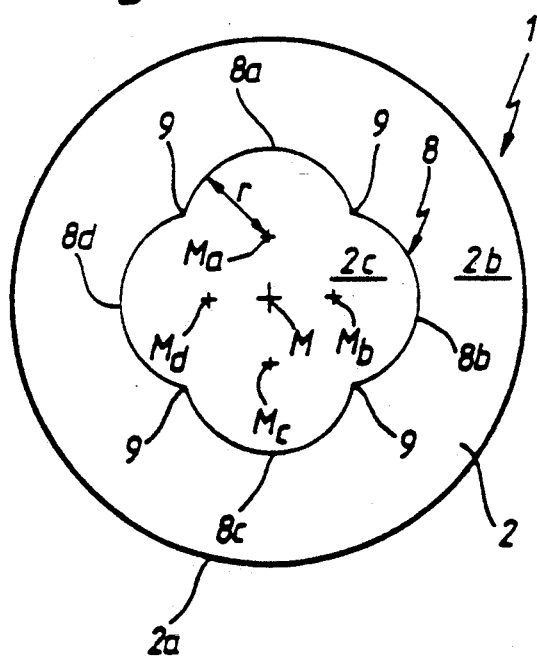

INFLATABLE IMPACT PROTECTION CUSHION

BACKGROUND AND SUMMARY OF THE INVENTION

The present invention relates to an inflatable impact protection cushion for the occupant of a motor vehicle cushion of disc-shaped form, having a cushion lower part fastened to a fixed vehicle part, in particular to the steering wheel, an inlet opening situated approximately in its center, and a circular cushion upper part which, upon inflation, moves forward away from the cushion lower part and is joined to the latter at the edge.

An impact protection device is shown in German Patent 2,152,902 where the impact protection cushion, intended as protection for the driver of a passenger car, is fixed to the steering wheel by its lower part which has an opening for the inflow of the gas inflating the cushion. On the opposite cushion upper part, an insert is firmly connected to the upper part; the insert is anchored to the steering wheel by cords as restraints. Upon inflation, this impact protection cushion initially opens out in the direction of the gas flow from the steering wheel in the direction of the head area of the driver, until the cords tensioned by the forward movement of the cushion upper part prevent any further forward movement in the direction of the area of the occupant's head. As a result, during the further course of the inflating operation, the impact protection cushion inflates in the transverse direction in a disc-like manner. Such restraining straps prevent the impact protection cushion from moving forwards in a radiating manner parallel to the gas inflow direction at high speed until in the area of the occupant's face.

"Automobiltechnische Zeitschrift", 91 (1989), Page 207, describes an inflatable impact protection cushion for a front passenger, in which tearing seams are arranged in the region of joining seams, which seams join the cushion side walls extending between cushion upper part and cushion lower part, for controlled opening out during inflation. The tearing seams hold together side regions of the protective cushion which are folded against one other so that, when they tear during the cushion inflating operation, in each case parts of the side walls of the cushion successively open out.

A similar tearing seam arrangement is also described in DE 38 18 185 C1 in which the gas can feed in in two different pressure stages. A breaking of the tearing seams does not commence until at the higher pressure stage, whereas the tearing seams hold together in the lower pressure stage. At low deceleration values, therefore, the impact protection cushion opens out only partially. The tearing seams are arranged in the region of adjacent joining seams between side parts and a central part of a protective cushion provided with a rectangular inlet frame and suitable, in particular, for a front passenger.

The present invention has an object of providing with little expenditure an impact protection cushion having favorable opening-out characteristics which is suitable, in particular, also for protecting the driver of a motor vehicle.

This object has been achieved in accordance with the present invention by an impact protection cushion upper part, which in the installed position, is folded onto the cushion lower part and is joined at the latter by at least one tearing seam extending in its central region. Both the opening-out operation and the opening-out speed of the impact protection cushion are advantageously influenced by the arrangement of a seam which joins the cushion lower part and the cushion upper part and can tear open during the inflating operation. The cushion upper part of the present invention remains on the cushion lower part at the beginning of the inflating operation in any event in the region of this seam. An abrupt forward movement of the cushion upper part in the direction of the vehicle occupant due to the inflowing gas stream is thereby prevented.

The effect is achieved that, at the beginning of the inflating operation, the impact protection cushion opens out primarily in the transverse direction, i.e. sidewards and upwards and downwards, before the seam tears and the impact protection cushion opens out completely. The tearing seam arranged in this way consequently compensates for the preferred opening-out in the direction of the vehicle occupant, caused by the inflow direction of the inflating gas, as a result of which the opening-out operation in this direction takes place much more uniformly and with a lower maximum spreading speed.

The improved opening-out characteristics of the present invention ensure a favorable opening-out operation with reduced weight, costs and production effort in comparison with the use of restraining straps, without any contact between opening-out parts of the impact protection cushion and the vehicle occupant to be protected occurring during the opening-out phase.

Another aspect of the present invention has the advantage that the central region of the cushion upper part opposite the gas inflow opening, which region is most likely to move forward quickly and abruptly, is surrounded by the tearing seam.

A configuration of an interrupted tearing seam of the present invention has the effect that the region enclosed by the tearing seam can already be inflated partially through the interruptions before the seam, as such, tears. This makes the operation of the cushion upper part moving forward even more uniform overall. The interruptions also provide favorable points of action for the tearing of the seam so that the tearing operation of the seam itself also does not take place abruptly. This is likewise beneficial for a uniform opening-out operation.

A symmetrical arrangement of the tearing seam with respect to the center point of the cushion upper part can also be provided, by a tearing seam extending coaxially with respect to the edge of a circularly shaped cushion upper part.

In the case of an uninterrupted tearing seam, it is advantageous to provide inflection regions which are suitable, in particular, as points of action for a commencing tearing-open of the seam and prevent an abrupt tearing-open.

According to yet another feature of the present invention, there are provided two tearing seams which require different tearing forces, one of which seams completely encloses the other. The forward movement of the cushion upper part in the direction of the vehicle occupant is made even more uniform as a result. It is determined by two tearing-open operations taking place one after the other. Such a two-stage arrangement of the tearing seams can be additionally refined in accordance with the present invention which refinements are further beneficial for a uniform opening-out operation of the cushion.

BRIEF DESCRIPTION OF THE DRAWINGS

These and other objects, features and advantages of the present invention will become more readily apparent from the following detailed description of currently preferred embodiments when taken in conjunction with the accompanying drawings wherein:

FIG. 1 is a plan view of a circular upper part of an inflatable impact protection cushion, folded in the installed position, having an interrupted tearing seam in accordance with the present invention;

FIG. 2 is a diagrammatic cross-section along line II—II of FIG. 1;

FIG. 3 is a view similar to FIG. 1, but with a different, uninterrupted tearing seam;

DETAILED DESCRIPTION OF THE DRAWINGS

Figure 4:
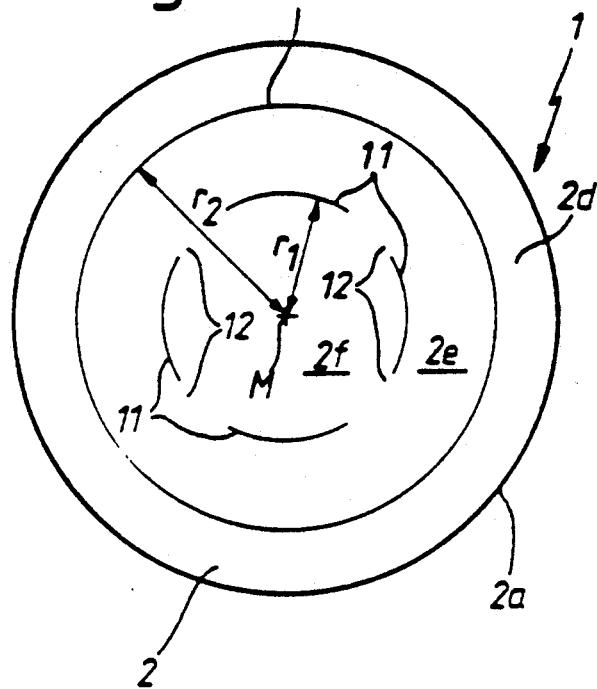
FIG. 4 is a view similar to FIG. 1, but with two tearing seams arranged coaxially with respect to each other.

The impact protection cushion designated generally by numeral 1, represented in the folded state in FIGS. 1 and 2, comprises a cushion lower part 5, a cushion upper part 2 and a joining seam 6, holding the lower and upper parts 5, 2 together. In this folded state, the impact protection cushion 1 has a disc-shaped form so as to be accommodatable on a steering wheel in the region of a vehicle steering column. For this purpose, the cushion lower part 5 is firmly connected to the steering wheel in the region of a central opening 7.

By way of the approximately central opening 7 in the lower part 5, the impact protection cushion 1 can be connected to a pressure vessel (not shown). For inflating the impact protection cushion 1, a gas stream G can be fed from the connected pressure vessel through the central opening 7 to the inside of the cushion 1. The gas flows in at a comparatively high speed, in order that the impact protection cushion 1 opens out very quickly. Without further additional measures, the gas stream G at one high speed would cause an abrupt forward movement of the cushion front part 2, in particular, of the central region 2c opposite the inflow opening 7, in the direction of the gas stream G and, consequently, in the direction of the vehicle driver sitting behind the steering wheel of the motor vehicle.

In order to prevent such a radiating forward movement of regions of the cushion upper part 2, a tearing seam 3 is arranged coaxially with respect to the circular outer edge 2a of the folded impact protection cushion 1 around the center point M of the circular cushion upper part 2. The center point M lies approximately opposite the center of the inlet opening 7 on the cushion lower part 5. The tearing seam 4 comprises a thread having a defined tearing strength, with which thread the cushion upper part 2 is stitched onto the fabric of the cushion lower part 5 in sections on a circular line. Instead of a thread, the seam may also comprise a welded or adhesively bonded connection. Interruptions 4 are provided in each case between the four approximately equally long circular arc sections of the tearing seam 3, through which interruptions gas can flow even when the tearing seam 3 is not yet torn.

As already stated above, without the tearing seam 3 the cushion upper part 2 would move at the beginning of the inflating operation in a radiating manner in the direction of the vehicle occupant due to the in-flowing gas G and only after that would the transverse expansion of the impact protection cushion 1 required for it to open out fully take place. Due to the tearing seams 3, initially only the central subregion 2c of the cushion front part 2 can move forward. Any further forward movement is prevented by the circumferential connection of the central region 2c to the cushion lower part 5 remaining in the steering wheel region by the tearing seams 3. Instead, now inflowing, further gas is diverted in the transverse direction and fed through the interruptions 4 into the region 2b of the cushion 1 laying outside the central region 2c.

Thus, a disc-shaped transverse opening-out of the impact protection cushion 1 is permitted before the threads of the tearing seam 3, having a predetermined tearing strength, then tear due to gas continuing to flow in. As a result, the connection away from the edge of cushion front part 2 and cushion lower part 5 is broken. It is evident that the tearing seam 3 influences the opening-out characteristics of the impact protection cushion 1 to the extent that initially only a slight forward movement of the central region 2c of the cushion upper part 2 takes place, followed by a substantially transversely directed expansion and only after that, due to tearing of the tearing seam 3, the complete opening-out in the forward and transverse directions. A radiating forward movement of a relatively small, central region of the cushion upper part 2 in the direction of the person to be protected is prevented by providing the tearing seam 3. Restraining straps which hold back the central region 2c are, therefore, not required.

A further way of achieving certain opening-out characteristics for the impact protection cushion 1 is brought about by the arrangement of a tearing seam 8 according to FIG. 3. Parts having the same function are provided there with the same reference symbols as in the case of the embodiment of FIGS. 1 and 2. To avoid a strong, sudden forward movement of the region around the center point M of the cushion upper part 2 folded onto a circular surface area, the tearing seam 8 is in this embodiment arranged continuously without interruption around the center point M. It closes off an inner subregion 2c from an outer subregion 2b of the cushion upper part 2.

The tearing seam 8 of FIG. 3 comprises four circular-arc-shaped sections 8a, 8b, 8c, 8d, arranged symmetrically with respect to the center point M. These sections 8a to 8d in each case form sections of a circular arc with radius r about respectively assigned center points $M_a$, $M_b$, $M_c$, $M_d$). At the points at which the individual sections 8a to 8d in each case abut one another, the tearing seam 8 forms inflections 9, which represent preferred points of action for tearing open the seam 8.

The inflating operation of the embodiment of FIG. 3 is basically analogous the embodiment of FIGS. 1 and 2. Initially, the central region 2c bulges forwards, to the extent allowed by the tearing seam 8, which joins the edge of the central region 2c to the cushion lower part. By introducing further gas, the tearing seam 8 comes increasingly under pressure and finally tears open, after which the impact protection cushion 1 opens out completely. The pressurized gas in the central region 2c thereupon escapes predominantly in the transverse direction into the outer region 2d, not yet under pressure. As a result, the impact protection cushion 1 opens out approximately homogeneously in all directions, without the cushion upper part 2 initially moving forward in a radiating manner before the transverse expansion of the protection cushion 1 takes place.

If need be, the tearing seam 8 can also join the cushion upper part 2 to the cushion lower part only loosely such that small quantities of gas can pass from the central region 2c into the edge region 2b through the tearing seam 8 already before the actual tearing-open of the seam 8, as happens in the case of the embodiment of FIG. 1 via the interruptions 4.

A combination of two tearing seams 10, 11 for the impact protection cushion 1 is shown in FIG. 4. The tearing seams 10, 11 are each arranged coaxially with respect to the circular outer edge 2a of the folded cushion upper part 2 of the impact protection cushion 1 around its center point M. The outer tearing seam 10 with greater radius $r_2$ divides the outer region 2d of the cushion front part 2 off from an annular intermediate region 2e, whereas the other tearing seam 11 with smaller radius $r_1$ delimits the intermediate region 2e inwards from a central region 2f around the center point M.

The inner tearing seam 11 is configured in a way corresponding to the tearing seam 3 in FIG. 1 as an interrupted seam comprising four circular arc sections. Interruptions 12 are provided between the individual sections. The outer tearing seam 10 forms a continuous, uninterrupted circular line. The seam material is chosen in each case for the two seams such that the outer tearing seam 10 tears already under the effect of lower forces than the inner tearing seam 11.

This arrangement of FIG. 4 produces the following basic opening-out characteristics of this two-stage tearing seam combination. Due to the gas fed in approximately centrally, there initially occurs a slight forward movement of the central region 2f, to the extent allowed by the inner tearing seam 11 with its high holding strength. At the same time, the gas flows in the transverse direction through the interruptions 12 into the annular intermediate region 2e, which as a result can likewise open out to a restricted extent, namely to the extent allowed, on one hand, inwards by the tearing seam 11 and, on the other hand, outwards by the tearing seam 10. Once the opening-out operation has taken place to the extent allowed by the two tearing seams 10, 11, gas continuing to flow in subjects the seams 10, 11 to increasing pressure. As a result, first of all the outer tearing seam 10 having the lower tearing strength yields and tears. Then, the gas can also penetrate into the outer edge region 2d and effect a further transverse opening-out, as well as to a certain extent a further longitudinal opening-out, of the impact protection cushion 1. Once the region 2d has also opened out and a certain positive pressure built up once again due to the gas continuing to flow in, finally tearing of the inner tearing seam 11 having the comparatively high tearing strength occurs. After the tearing-open of the seam 11, the connection of cushion upper part 2 and cushion lower part is completely severed and the opening-out of the impact protection cushion 1 is completed. It is again evident that, due to the arrangement of the tearing seams 10, 11, the impact protection cushion 1 is inflated in the various directions without there being any great preference for the opening-out in the direction of the gas inflow direction and the cushion upper part therefore moving forward at the beginning of the inflating operation in a radiating manner in the direction of the person to be protected.

Figure 5:
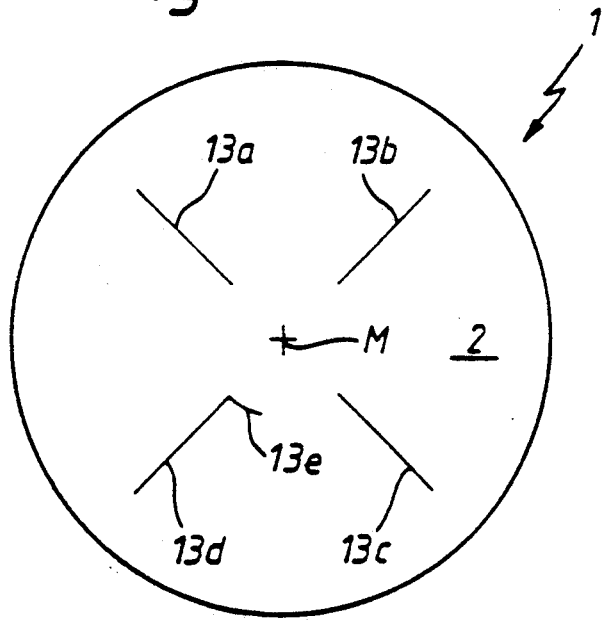
FIG. 5 is a view similar to FIG. 1, but with tearing seams arranged in a stellate manner.

It has also been found that particularly favorable opening-out characteristics can be achieved by a stellate arrangement of the tearing seams. The embodiment of FIG. 5 includes four such tearing seams 13a, 13b, 13c, 13d which are arranged in a stellate manner, offset in each case by 90° from one another and which extend substantially radially outwards from the center point M of the impact protection cushion 1. They are in this case arranged at a certain distance from the center point M. By suitable selection of the length of the individual tearing seams and their distance from the center point M, desired opening-out characteristics can be obtained. The individual tearing seams may be equally long or, as in the embodiment of FIG. 5, of different lengths. It may also be expedient to provide the tearing seams with sections extending in the tangential direction, which likewise influences the opening-out operation. For instance, one tearing seam 13d in FIG. 5 is made L-shaped at 13e. With their sections facing the gas inlet opening, the tearing seams 13a to 13d again prevent a central region of the cushion upper part 2 moving forward abruptly. The stellate tearing seam arrangement also proves to be favorable because, by virtue of their radial extent, the tearing seams do not tear open abruptly but gradually outwards from the center point M. In addition, the pressure built up in the central region of the impact protection cushion 1 at the beginning of the inflating operation can partially flow away radially outwards between the individual tearing seams already at an early stage. As already stated, the exact way in which inflation proceeds is controlled by the selection of the length and position of the individual tearing seams. It is self-evident that, instead of the four tearing seams shown, also fewer or more may be arranged in an approximately stellate manner.

In additional embodiments, the tearing seam joining cushion upper part and cushion lower part may also be arranged such that the expanding and spreading speed of the impact protection cushion takes place in a desired controlled manner. The tearing seams need not necessarily be made symmetrically, as in the embodiment of FIG. 5. The opening-out characteristics of the impact protection cushion can be controlled at will by the tearing seam extending appropriately.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An inflatable impact protection cushion of disc-shaped form, comprising a cushion lower part, fastened to a fixed vehicle part, and provided with an approximately central inlet opening and, a circular cushion upper part which, upon inflation, moves forward away from the cushion lower part and is joined to the cushion lower part at an edge, the cushion upper part being configured such that, in the installed position, it is joined to the cushion lower part by at least one tearing seam extending in a central region along a continuous curve which surrounds the opening on the cushion lower part, wherein the at least one tearing seam further comprises four circular arc sections respectively abutting one another in pairs to form an inflection, the center points of which sections all have the same distance from a center point of the cushion upper part and are offset by 90° from one another.

2. An inflatable protection cushion of disc-shaped form, comprising a cushion lower part, fastened to a fixed vehicle part, and provided with an approximately central inlet opening and, a circular cushion upper part which, upon inflation, moves forward away from the cushion lower part and is joined to the cushion lower part at an edge, the cushion upper part being configured such that, in the installed position, it is joined to the cushion lower part by at least one tearing seam extending in a central region along a continuous curve which surrounds the opening on the cushion lower part, wherein two tearing seams are provided along two coaxial circular lines with a different radius, which tearing seams are arranged approximately symmetrically with respect to the center point of an approximately circular cushion upper part wherein the outer tearing seam with a first radius has a lower tearing strength than the inner tearing seam with a second radius smaller than the first radius.

3. An inflatable impact protection cushion, of disc-shaped form, comprising a cushion lower part, fastened to a fixed vehicle part, and provided with an approximately central inlet opening and, a circular cushion upper part which, upon inflation, moves forward away from the cushion lower part and is joined to the cushion lower part at an edge, the cushion upper part being configured such that, in the installed position, it is joined to the cushion lower part by at least one tearing seam extending in a central region along a continuous curve which surrounds the opening on the cushion lower part, wherein approximately radially extending tearing seams are provided in a stellate configuration and at least one tearing seam has an approximately tangentially extending section.

* * * * *